United States Patent [19]
Clinger et al.

[11] 3,727,229
[45] Apr. 10, 1973

[54] BALLOON SIGNALLING APPARATUS

[76] Inventors: Bordean Wardell Clinger, Etna, Wyo. 83118; Robert F. Parthum, 6176 127th Place, S.E., Bellevue, Wash. 98006

[22] Filed: July 29, 1971

[21] Appl. No.: 167,103

[52] U.S. Cl. ................. 343/706, 325/112, 325/18 B, 343/215 H
[51] Int. Cl. ............................................. H01q 1/28
[58] Field of Search ........................... 325/111, 112; 343/706, 18 R, 18 B, 18 D, 915 A

[56] References Cited

UNITED STATES PATENTS

| | | | |
|---|---|---|---|
| 3,171,128 | 2/1965 | Shattuck | 343/706 |
| 3,471,854 | 10/1969 | McKern | 340/366 |
| 3,295,132 | 12/1966 | Chapman, Jr. | 343/18 |

Primary Examiner—Benjamin A. Borchelt
Assistant Examiner—A. M. Psitos
Attorney—Conrad O. Gardner

[57] ABSTRACT

A lighter than air device is utilized to provide passive and/or active signalling in an apparatus which is semi-automatic in operation because of certain housing features. A twisted pair of cables is optionally utilized to cause a radar reflective surface of high energy reflecting design to rotate for 360° retransmission of search radar signals. The balloon structure has a hemispherical coating which rotates as the twisted pair of cables ravels and/or unravels about the axis along its extended length slowly thus causing blips to appear on the search radar screen and thereby identifying the location of the signalling apparatus.

8 Claims, 4 Drawing Figures

PATENTED APR 10 1973  3,727,229

INVENTORS,
BORDEAN W. CLINGER
ROBERT F. PARTHUM
BY
ATTORNEY

BALLOON SIGNALLING APPARATUS

The present invention relates to signalling apparatus utilizing lighter than air devices for supporting the antenna system portion of the apparatus.

Metallized coated balloons detectable by high flying radar equipped radar search aircraft have merely depended upon the outer spherical reflecting surface of the balloon for reflection as for example in U.S. Pat. No. 3,279,419 to Demarco or in order to obtain rotation have depended upon complex balloon structure having flat surfaces and ribs to provide rotation of the reflecting surface as shown in U.S. Pat. No. 3,181,158 to Feldman. While an airborne reflector should be preferably spherical to simplify packing in small containers, ease inflation, and reduce cost of manufacture; superior reflection characteristics are of primary importance in their detection by airborne search radar at increased ranges since detection is a function of the amount of energy that the balloon signalling apparatus is capable of reflecting back along the same path from whence it came.

Present apparatus of the balloon signalling type has been too complex for simple operation by boy scouts, injured soldiers, women or young children who heretofore had to be instructed on deployment of the gas generating means, coupling to the balloon or various other compexities inherent in the very few types of apparatus available.

It is therefore an object of this invention to provide a balloon signalling apparatus susceptible of deployment in a minimum number of uncomplicated steps by the operator.

It is a further object of this invention to provide radar reflective signalling modes of types heretofore unknown in spherical balloon apparatus.

It is yet a further object of this invention to provide an apparatus including lighter than air balloon type supporting means which provides a maximum of efficiency in three signalling modes, viz. by visual alert or observation, radar observation, and by radio signalling.

It is still another object of this invention to provide in a balloon signalling apparatus, container structure facilitating deployment of the balloon and gas filling thereof in a semi automatic manner wherein by the unique assembly and structure thereof, certain steps are eliminated.

These and further objects and advantages of the invention will be more readily understood from the following description considered with the accompanying drawings, in which.

Figure 1:
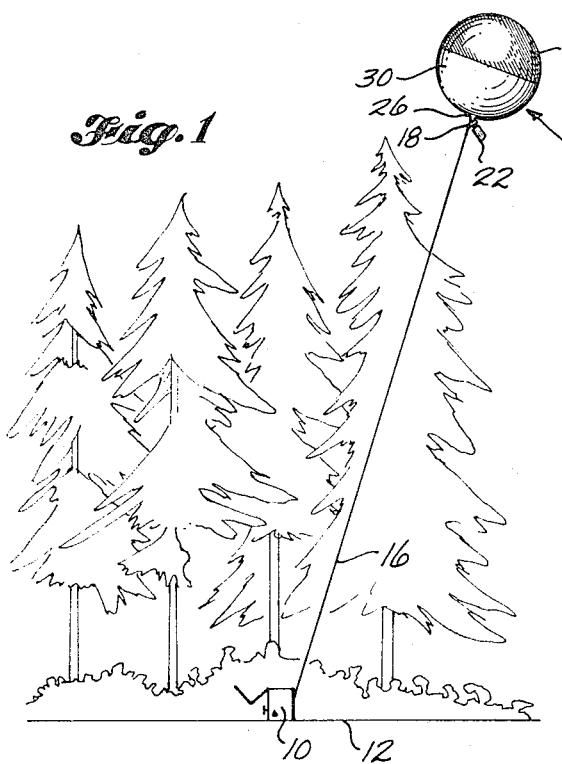
FIG. 1 is a diagrammatic view illustrating the signalling apparatus in deployed condition for signalling purposes.

Referring now to the drawing, and particularly FIG. 1 thereof, there is shown the signalling apparatus housing 10 held or positioned substantially at ground level 12. Coupled between the housing 10 and balloon structure 14 is a conductive coupling element 16 comprising a single wire having an upper end 18 attached to a collar 20 (See FIGS. 3 and 4) by solder or connecting screw (not shown). Collar 20 couples the lower end 26 of balloon structure 14 to gas cartridge 22 and serves as anchor for the aforementioned upper end 18 of wire coupling element 16. Balloon structure 14 shown in FIG. 1 is spherically shaped and comprises an upper or northern hemispherical conductive coating 28 and is without such a coating over the lower hemisherical portion or half 30. A thin coating of material such as phosphor coats at least a portion of the sherical balloon structure, e.g., the lower hemispherical portion 30. A transmitter 32 (See FIGS. 3 and 4) supplies r.f. energy to wire coupling element 78 which radiates as an antenna and to the balloon structure 14 which when filled with gas is r.f. excitable to luminescence in the same manner as a fluorescent light tube. This phenomenon in itself is well known in the art and will not be discussed further herein. If it is desired to deliver all the r.f. energy to balloon structure 14 for increased brilliance rather than utilizing coupling element 78 as a radiator or antenna then coupling element 78 can be a shielded wire with the shield or outer portion grounded to housing 10 to form a coaxial type transmission line and conduct substantially all the energy from transmitter 32 to balloon structure 32. A high powered transmitter 32 is not contemplated particularly where there are critical space and weight limitations limiting battery size. It should be noted that as balloon structure diameter increases more r.f. energy and consequent transmitting power is required for full luminescence. As wire 16 twists or rotates slowly about is extended axis which is substantially vertical with respect to groung surface 12, balloon structure 14 rotates but upper hemisphere metallic coating 28 which may be disposed on the inner surface or outer surface or impregnated in the balloon surface remains substantially always oriented in an upward direction toward downward looking search radar.

Figure 2:
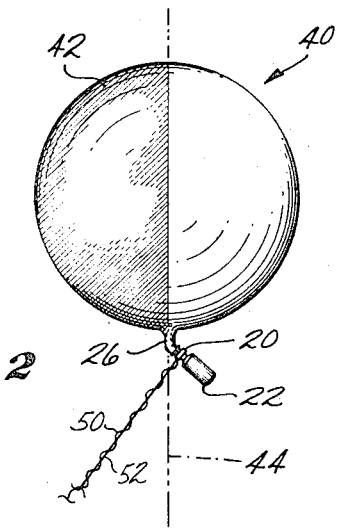
FIG. 2 is a side elevational view of a further balloon reflector arrangement and coupling arrangement between balloon and container.

Turning now to FIG. 2, a further embodiment of balloon structure 40 will be seen where a conductive surface formed by a metallic surface 42 coats one side of spherical balloon structure 40. This western hemispherical coating 42 will rotate about a vertical axis with respect to ground level 12 which vertical axis also passes through the lower end 26 of balloon structure 40. This hemispherical coating 42 so disposed will expose alternately its convex and concave surfaces in each direction of the compass upon a single rotation about its vertical axis 44. As a consequence, the inner side (concave) of conductive surface 42 forms a radar dish antenna which collects and refects back (retrodirective) more energy and consequently provides better detection by more distant search radar than the convex or outer balloon side of conductive surface 42 which it will be recognized by those skilled in the antenna art reflectively redirects energy impinging thereon mostly outwardly away in directions away from instead of towards the search radar. The dish reflector formed by conductive surface 42 is a type antenna well understood in the antenna art and the theory of operation and design will as a consequence not be detailed herein. In the case of an experimental device constructed and tested, it was found that the balloon structure 14 of FIG. 1 of a diameter of 18 inches utilizing natural gas therein had sufficient lift power to raise the antenna of transmitter 32 comprising a very fine wire element 16 of 40 gauge copper having a length of 470 feet. It should be recognized that a distress frequency of 2,182 KHz(kilohertz) the antenna 16 is in the range of one wavelength (approximately 400 meters) in length which is an effective type antenna for radiating with maximum efficiency available from low power(viz. under 100 watts) transmitter 32. At a lower distress frequency a balloon having increased lift would be required to lift a longer (physical length) element 16 or some further matching and tuning of wire 16 would be required. Homing receivers or triangulation techniques may be utilized to then obtain a fix on antenna 16 when transmitter 32 is turned on.

While balloon structure 40 of FIG. 2 may utilize any of the lighter than air gases such as, e.g., helium and hydrogen which maximize lift power to reduce balloon size requirements and cannister 22 size and the consequent size overall of the apparatus, the means coupling the balloon structure 40 to housing 10 in this further embodiment of the invention includes multifilament means comprising a twisted pair consisting of a copper wire 50(narrower than the 40 gauge monofilament coupling 16 of FIG. 1) and a nylon cable 52 of very light weight and great strength compared to wire 50. This arrangement of coupling between balloon structure 40 and housing 10 gives lightness to the coupling since it does not rely on the heavy copper wire itself also for balloon anchor as was the case in the embodiment of FIG. 1. This twisted pair including wire 50 and nylon filament 52 is coupled by direct attachment to collar 20 as shown in FIG. 2 and the wire 50 is coupled to the transmitter output terminal 60 as was conductor 16 in FIG. 1. Nylon filament 52 however is run parallel with conductor 16 as a twisted pair along the same route to prevent a break in conductor 16 and loss of the balloon structure and also minimize the weight of the coupling means between housing 10 and the balloon structure. The use of a twisted pair causes slow rotating action of balloon structure 40 supporting reflector dish 42 for increased reflection of search radar energy in the different compass directions so that detection on the search radar screen is facilitated. The diameter of balloon structure 40 will govern the diameter of the dish and may be optimized with respect to the particular search radar frequency used in accordance with known antenna dish design considerations shown in standard microwave texts. Since search radar may operate in the 10 centimeter wavelength region of the radio spectrum, it will be seen that the conductive surface 42 may be made of such diameter as to realize appreciable reflector gain characteristics at microwave frequencies of a range including this frequency.

Figure 3:
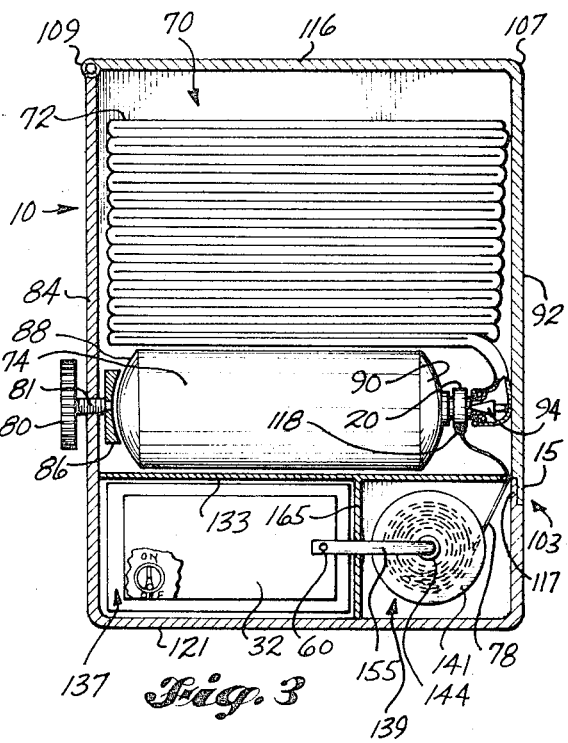
FIG. 3 is a side view taken in section showing the signalling apparatus before deployment thereof; and, FIG. 4 is a perspective view in partial section broken away to more clearly illustrate the signalling apparatus of FIG. 3.
Figure 4:
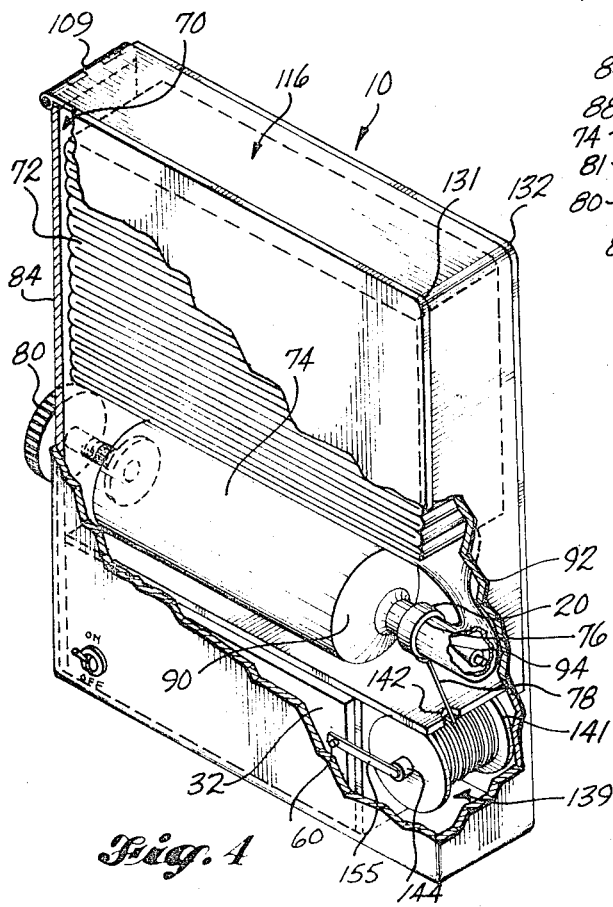

Turning now to FIGS. 3 and 4 and to a more detailed description of balloon signalling apparatus housing 10, it will be noted that the housing 10 contains internal compartment 70 for containing the collapsed expandable vessel means comprising balloon 72 which may be a sherical balloon structure like those denoted by numerals 14 and 40 respectively of FIGS. 1 and 2 or of cylindrical shape as shown in FIGS. 3 and 4 which is shown in these Figures as and having the capability of being folded over layer after layer upon itself in a vertical column of predetermined length, width and height.

Internal compartment 70 includes a lighter than air gas source comprising cannister 74 containing helium under pressure which is operatively connected to inlet 76 of the balloon 72 by means of collar 20 hereinbefore discussed, connecting means 78 which acts as an antenna and/or anchor between balloon 72 and housing 10 being also connected to collar 20. A cylindrically shaped member 80 which forms a rotating handle external of the housing 10 is coupled to turn screw 81 threaded through housing wall 84 which screw 81 is further coupled inside housing 10 and within internal compartment 70 to drive cylindrically shaped plunger element 86. Plunger element 86, turn screw 81, and cylindrically shaped member 80 are disposed concentrically about an axis passing at right angles to and through housing wall 84 and opposite housing wall 92, and these elements are operatively connected so that a single rotation by the hand of the operator of cylindrically shaped member 80 causes direct drive of plunger element 86 and consequent motion of plunger element 86 inward (with respect to housing wall 84) against a first end surface 88 of cannister 74 thus causing movement of second end surface 90 of cannister 74 towards opposite housing wall 92. Puncturing device 94 supported by opposite housing wall 92 is driven through a seal (not shown for clarity) across the outlet of cannister 74 by the above described motion of plunger element 86, causing lighter than air gas to flow from cannister 74 through balloon inlet 76. Friction catch 103 is pushed or popped open semi automatically by such forces against the inner wall surface of opposite housing wall 92 as the above described forces on puncturing device 94 or by the expansive force developed by the expansion of balloon 72, or depending upon design tightness (the amount of force needed to open friction catch 103) by by manual release of friction catch 103 by a push of the hand of the operator against the upper corner 107 of the opposite housing wall 92 upwards causing rotation of opposite housing wall 92 about pivot and spring hinge 109 upward and away from expanding balloon 72. Pivot and spring hinge 109 may be molded into housing 10 where housing 10 is made of a hard plstic material such as plexiglass. It should be noted in viewing FIG. 3 that opposite housing wall 92 forms a major portion of the right side and the entire top portion 116 of housing 10. Friction catch means 103 it should be noted comprises the end portion of opposite housing wall 92 most remote from pivot and spring hinge 109 which terminates in the form of a lip 15 overlying in friction fit an integral indented portion 117 which forms the end of housing wall 84 most remote from pivot and spring hinge 109. Housing wall 84 ( which includes the bottom portion 121 of housing 10) and opposite housing wall 92 ( which includes the top portion 116 of housing 10 which opens up in the aforementioned manner ) are sandwiched between first wall panel member 131 and second wall panel member 132 to form the outer wall surfaces of housing 10. Floor panel member 133 separates internal compartment 70 containing cannister 74 and balloon 72 from first bottom compartment 137 containing transmitter 32 and second bottom compartment 139 containing spool 141 which houses connecting means 78 ( the twisted pair 50 and 52 in the embodiment of FIG. 2). An aperture 142 is cut in floor panel member 133 to provide free reel out of connecting means 78 off of spool 141 under the upward lift from ground level 12 of balloon structure 72 ascending into the atmosphere. Coupling of the end of connecting means 78 remote from the collar 20 anchor point is made to the conductive spool axis 144. The conductive spool axis 144 is supported between support collars ( not shown) made of plastic integrally formed as by molding from the inner surfaces of first wall panel member 131 and second wall panel member 132 for free rotation of spool 141 and deployment of balloon 72. A conductive strip 155 of metal foil, e.g., copper provides coupling continuously of transmitter output terminal 60 to conductive spool axis 144 in the manner of commutator action so that after rotation out of connecting means 78 from spool 141 there is then no need to connect up the antenna to transmitter 32. A divider wall 165 extending between floor panel member 133 and the bottom portion 121 of housing 10 sandwiched between first wall panel member 131 and second wall panel member 132 forms and divides first bottom compartment 137 from second bottom compartment 139. Transmitter 32 is actuated or turned on by a toggle switch 17 having the positions labelled ON and OFF as shown on first wall panel member 131 which turns on the power supply of transmitter 32 (batteries carried inside transmitter 32). Housing 10 is desirably made of plastic and sized to fit an average shirt pocket ( 3 by 4 by three fourths inches) but may be larger depending upon utilization of active signalling means comprising transmitter 32 in housing 10 and other considerations of design leading to increased space requirements.

What is claimed is:

1. A balloon signalling apparatus comprising in combination:
    an inflatable balloon of spherical shape having an inlet for the introduction of a lighter than air gas;
    a cannister containing a lighter than air gas under pressure operatively connected to said inlet;
    valve means comprising a puncturing device and seal, said valve means controlling the flow of said lighter than air gas from said cannister through said inlet to expand said balloon with lighter than air gas upon puncture of said seal by said puncturing device;
    a housing for storing said inflatable balloon and said cannister prior to deployment thereof;
    coupling means extending between said balloon inlet region and said housing for anchoring said balloon when deployed, said coupling means further providing rotation of said balloon about its vertical axis relative to the upper end of said coupling means; and,
    a conductive hemispherically shaped surface supported by the wall of said spherically shaped balloon for providing a rotating dish antenna upon rotation of said balloon.

2. A balloon signalling apparatus having a normally deflated balloon, a device for inflating the balloon so that it will rise and float in the air, and a housing for both said deflated balloon and said device, said housing comprising a housing wall and an opposite housing wall, first ends of said housing wall and said opposite housing wall being connected together by a pivot and spring hinge, the second ends of said housing wall and said opposite housing wall arranged in overlapping relationship to provide a friction fit, said housing wall and said opposite housing wall disposed in sandwiched relationship between first and second wall panel members, said housing wall, opposite housing wall, and first and second wall panel members forming the four outer wall surfaces of said housing, a cylindrically shaped member disposed outside said housing coupled to a turn screw threaded through an outer wall surface, said turn screw further coupled to means disposed within said housing for inflating said balloon upon turning of said cylindrically shaped member.

3. The combination according to claim 2 further comprising a transmitter disposed within said housing, and a spool for supporting an antenna wire also disposed within said housing, said spool having a conductive spool axis coupled to a first end of said antenna wire, and a conductive material disposed between said conductive spool axis and the output terminal of said transmitter to provide continuous electrical coupling between said terminal and said antenna during rotation of said spool.

4. The combination according to claim 3 wherein said balloon and said device for inflating said balloon are disposed in a first internal compartment within said housing and said transmitter is disposed in a further compartment within said housing.

5. The combination according to claim 2 further comprising a transmitter disposed within said housing and coupling means between said transmitter and said balloon comprising a twisted pair including a wire and nylon filament for giving strength to said twisted pair.

6. The combination according to claim 2 further comprising a collar for coupling said balloon to said device for inflating said balloon.

7. The combination according to claim 6 further including coupling means attached to said collar and coupled to said transmitter for anchoring said balloon in a deployed condition.

8. In a balloon signalling apparatus including a radio transmitter having a wire coupled from said radio transmitter to a balloon structure containing a lighter than air gas, the improvement comprising in combination therewith:
    a coating of fluorescent material supported by at least a portion of the wall surface of said balloon for causing luminescence of said balloon upon conduction of radio frequency by said wire from said transmitter to said balloon structure, said wire including shielding along the length thereof extending between said transmitter and said balloon.

* * * * *